Sept. 29, 1970     W. H. SORENSEN     3,531,138
BICYCLE SAFETY DEVICE
Filed Aug. 27, 1968     2 Sheets-Sheet 1
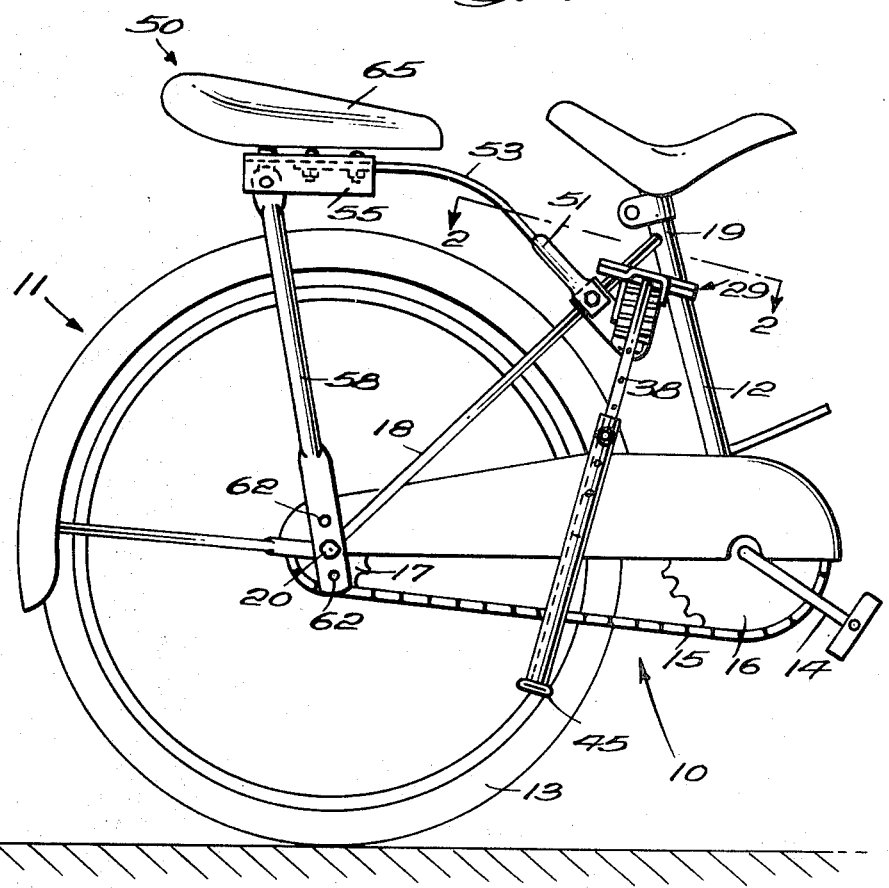
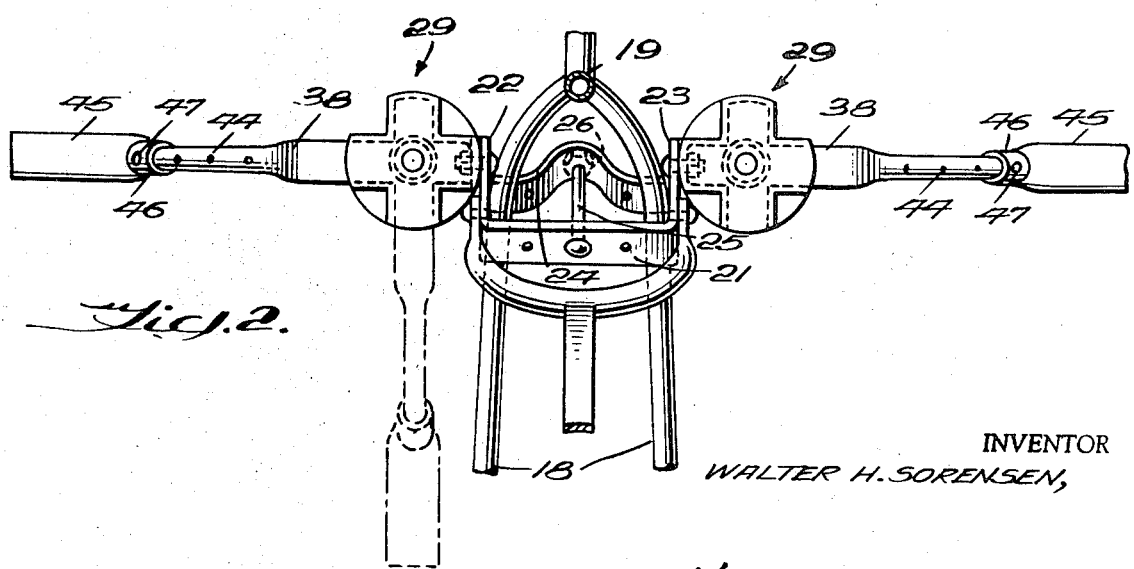
INVENTOR
WALTER H. SORENSEN,
BY *Kimmel, Crowell & Weaver*
ATTORNEYS

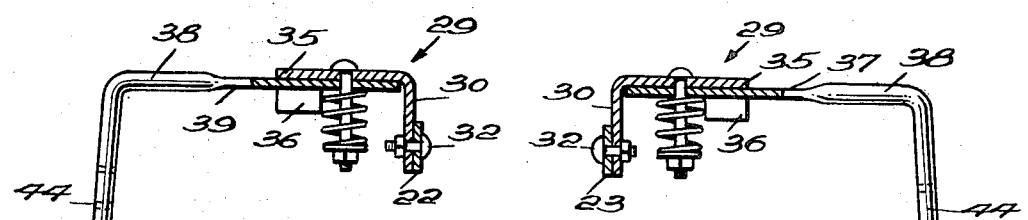
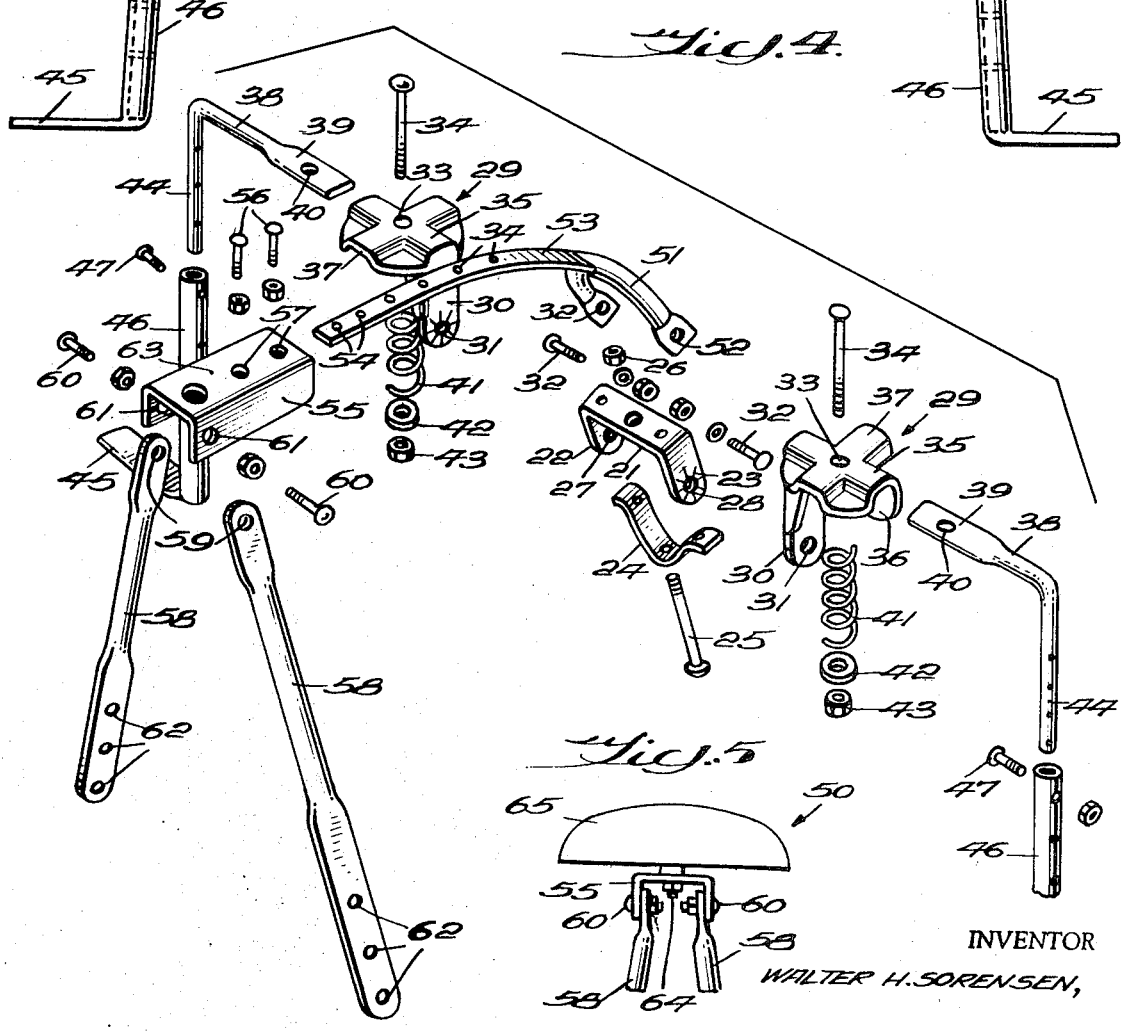

United States Patent Office 3,531,138
Patented Sept. 29, 1970

3,531,138
BICYCLE SAFETY DEVICE
Walter H. Sorensen, Rte. 11, Box 160H,
San Antonio, Tex. 78213
Filed Aug. 27, 1968, Ser. No. 755,754
Int. Cl. B62j 25/00
U.S. Cl. 280—291                                      3 Claims

ABSTRACT OF THE DISCLOSURE

A bicycle safety device for carrying a second passenger including adjustable folding footrest and an adjustable seat mounted over the rear axle of the bicycle.

---

The present invention relates to a footrest and seat attachment for bicycles in which the seat can be adjusted to fit several sizes of bicycles and the footrest, in normal position, is arranged to clear the pedals during the operation of the bicycle. The footrest is vertically adjustable and can be collapsed to a position extending only slightly outwardly from the side of the bicycle.

In prior art devices, rear footrests for the bicycle are conventionally mounted at the back axle and were arranged so that they were either too wide or interfered with the operation of the pedals of the bicycle. The present seat and footrest maintains the balance of the bicycle much closer to the center; and positions the feet so as to completely miss the pedals during the operation of the bicycle.

The primary object of the invention is to provide a second passenger carrying attachment for a bicycle which is inherently safe and supports the second passenger so as to avoid interference with the operation of the bicycle.

Another object of the invention is to provide a device of the class described above in which the footrest can be collapsed against the side of the bicycle when out of use.

Other objects and advantages will become apparent in the following specification when considered in light of the attached drawings.

DESCRIPTION OF THE DRAWINGS

FIG. 1 is a side elevation of a bicycle with the invention attached thereto, shown partially broken away for convenience of illustration;

FIG. 2 is a top plan view of the invention taken along the line 2—2 of FIG. 1 looking in the direction of the arrows;

FIG. 3 is a vertical sectional view taken through the footrest shown partially in elevation and broken away for convenience of illustration;

FIG. 4 is an exploded prospective view of the footrest assemblage; and

FIG. 5 is an end elevation of the seat support, parts broken away for convenience of illustration.

DESCRIPTION OF THE PREFERRED EMBODIMENT

Referring now to the drawings in detail, wherein like reference characters indicate like parts throughout the several figures, the reference numeral 10 indicates generally a bicycle safety device attached to the rear of a conventional bicycle 11.

The bicycle 11 is of completely conventional design and includes a frame 12 having a rear wheel 13 mounted therein and driven by pedals 14 through a sprocket chain drive 15 cooperating with sprockets 16, 17 all in a conventional manner.

The frame 12 includes a pair of spaced apart tubular members 18 extending from the upper portion of the seat post 19 downwardly and rearwardly to the rear axle 20.

The bicycle safety device 10 includes a U-shaped bracket 21 having a pair of spaced apart parallel ears 22, 23 integrally formed thereon. The U-shaped bracket 21 is adapted to engage over the tubular members 18, and an arcuate jaw 24 also engages the tubular members 18 oppositely of the U-shaped bracket 21. The jaw 24 is secured to the bracket 21 by a bolt 25 and nut 26 to clamp the bracket 21 and jaw 24 to the tubular members 18. The ears 22, 23 are provided with transverse bores 27, 28, respectively. In the case of bicycles, where a single tubular member 18 is used, two bolts extend through the outer holes in the bracket 21 and jaw 24.

A retainer generally indicated at 29 is provided with a depending ear 30 having a bore 31 formed therein. A bolt 32 extends through the bore 31 and through the bore 27 to secure one of the retainers 29 to the ear 22 and a second bolt 32 extends through the bore 31 and the bore 28 to secure a second retainer 29 to the ear 23. The retainers 29 may be pivotally adjusted about the bolts 32 and retained in adjusted position by tightening the bolts.

The retainer 29 has a central vertical bore 33 to receive a bolt 34 extending downwardly therethrough. A channel 35 extends across the retainer 29 and has a stop 36 integrally formed with the retainer 29 and extending downwardly from the channel 35 oppositely of the ear 30. A second channel 37 extends generally perpendicularly to the channel 35 for reasons to be assigned. An arm 38 is provided with a flattened portion 39 formed to engage in the channels 35, 37 and has a vertical bore 40 extending therethrough. The bolt 34 extending through the bore 33 also extends through the bore 40 and receives a coil spring 41 and washer 42 on the lower end thereof retained by nut 43 or, if desired, may be a cotter key (not shown). The spring 41 engages under the lower side of the arm 38 and normally retains the arm 38 within either the channel 35 or the channel 37. The arm 38 is provided with an angularly extending depending member 44 as can be best seen in FIG. 4. A footrest 45 is provided with an upstanding tubular support 46 which telescopically engages over the member 44 and is adjustably secured thereto by a bolt 47.

The footrest 45 is normally positioned to extend outwardly from the bicycle as illustrated in FIG. 3 with the arm 38 retained in channel 35. When the footrests 45 are out of use, the arm 38 is grasped firmly and swung rearwardly until the flattened portion 39 engages in a channel 37 with the footrest 45 closely adjacent the side of the bicycle. Should the bicycle come so close to an object with the footrests 45 in extended position so that the footrest 45 strikes it, the footrest 45 will swing into a position along side of the bicycle without causing a spill of the rider.

While the foot support described above may be used with any seat or a luggage rack on a conventional bicycle, one seat which may be used therewith is illustrated generally at 50. The seat 50 includes an arcuate yoke 51 having a pair of bores 52 formed in the opposite ends thereof. The yoke 51 engages over the bracket 21 with the bolts 32 extending through the bores 52 thereof. An arcuate bar is integrally connected to the bight of the yoke 51 and extends rearwardly therefrom. A plurality of adjustment holes 54 are formed in the bar 53 in spaced apart relation. A generally U-shaped seat mount 55 is secured to the bar 53 by a pair of bolts 56 which extend through a pair of bores 57 in the mount 55 and through a pair of the bores 54 in the bar 53. A pair of braces 58 are provided with bores 59 in their upper ends which receive bolts 60 extending through bores 61 in the seat mount 55. The lower ends of the braces 58 are provided with bores 62 for securing the braces 58 to the axle 20 of any one of several sizes of bicycle. A bore 63 in the seat mount 55 receives a bolt 64 extending downwardly from a saddle 65 to secure the saddle 65 to the seat mount 55.

By adjusting the height of the braces 58 and of the position of the seat mount 55 on the bar 53, the seat 50 may be adapted for twenty-four, twenty-six, and twenty-eight inch bicycles. Similarly, the height of the footrest 45 may also be adjusted to fit the same bicycles.

Having thus described the preferred embodiments of the invention, it should be understood that numerous structural modifications and adaptations may be resorted to without departing from the spirit of the invention.

What is claimed is:

1. A passenger foot support for a bicycle having a passenger seat located above the rear wheel of the bicycle comprising a bracket adapted to be detachably secured to the rear fork of the bicycle adjacent to its connection with the seat post, a pair of retainers secured to said bracket, said retainers being adapted to be disposed outwardly of and on opposite sides of said rear fork, each of said retainers having a pair of centrally intersecting channels formed therein, and a substantially vertical member at the intersection of said channels, means for supporting the passenger's feet including a pair of upstanding support members, an angularly extending arm at the top of each of said support members and an angularly extending footrest at the bottom of said support members, said arms being respectively journaled on said vertical members for pivotal movement thereabout, and resilient means on each of said retainers for releasably maintaining said arms in a selected one of said channels.

2. A device as set forth in claim 1 wherein said support members are vertically adjustable for varying the height of said footrests.

3. A device as set forth in claim 1 and a seat support for said passenger seat, a pair of braces attached to said seat support and adapted to be connected to the rear axle of said bicycle and a bar having one end thereof detachably secured to said seat support and having the other end thereof detachably secured to said bracket.

References Cited

UNITED STATES PATENTS

| | | | |
|---|---|---|---|
| 605,699 | 6/1898 | Cowden | 297—243 |
| 618,195 | 1/1899 | Zack | 297—243 |
| 993,567 | 5/1911 | Stickelbaut | 280—291 |
| 1,045,220 | 11/1912 | Turner | 297—243 |
| 3,329,443 | 7/1967 | Lowder et al. | 280—166 |

LEO FRIAGLIA, Primary Examiner

R. R. SONG, Assistant Examiner

U.S. Cl. X.R.

297—243